D. W. PROEBSTEL.
WATER STAGE INDICATOR.
APPLICATION FILED MAR. 31, 1914.
1,229,785.
Patented June 12, 1917.
3 SHEETS—SHEET 1.
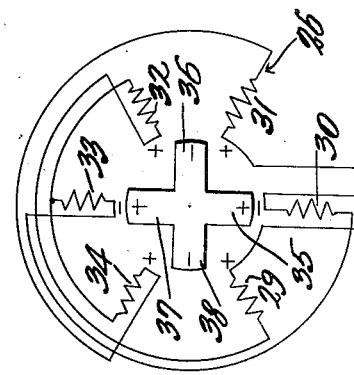
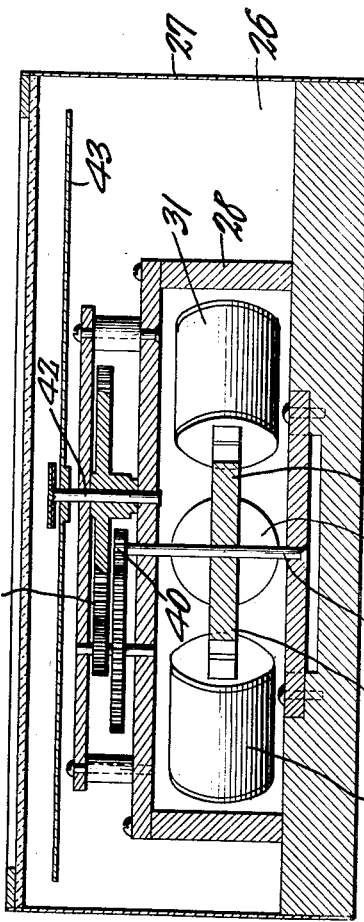
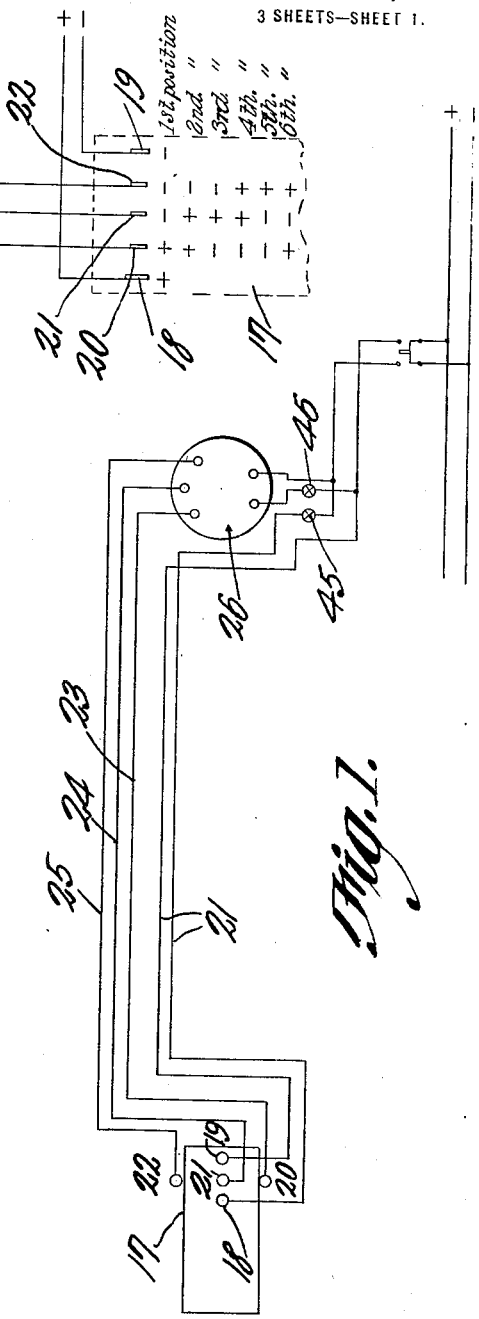

D. W. PROEBSTEL.
WATER STAGE INDICATOR.
APPLICATION FILED MAR. 31, 1914.
1,229,785.
Patented June 12, 1917.
3 SHEETS—SHEET 2.
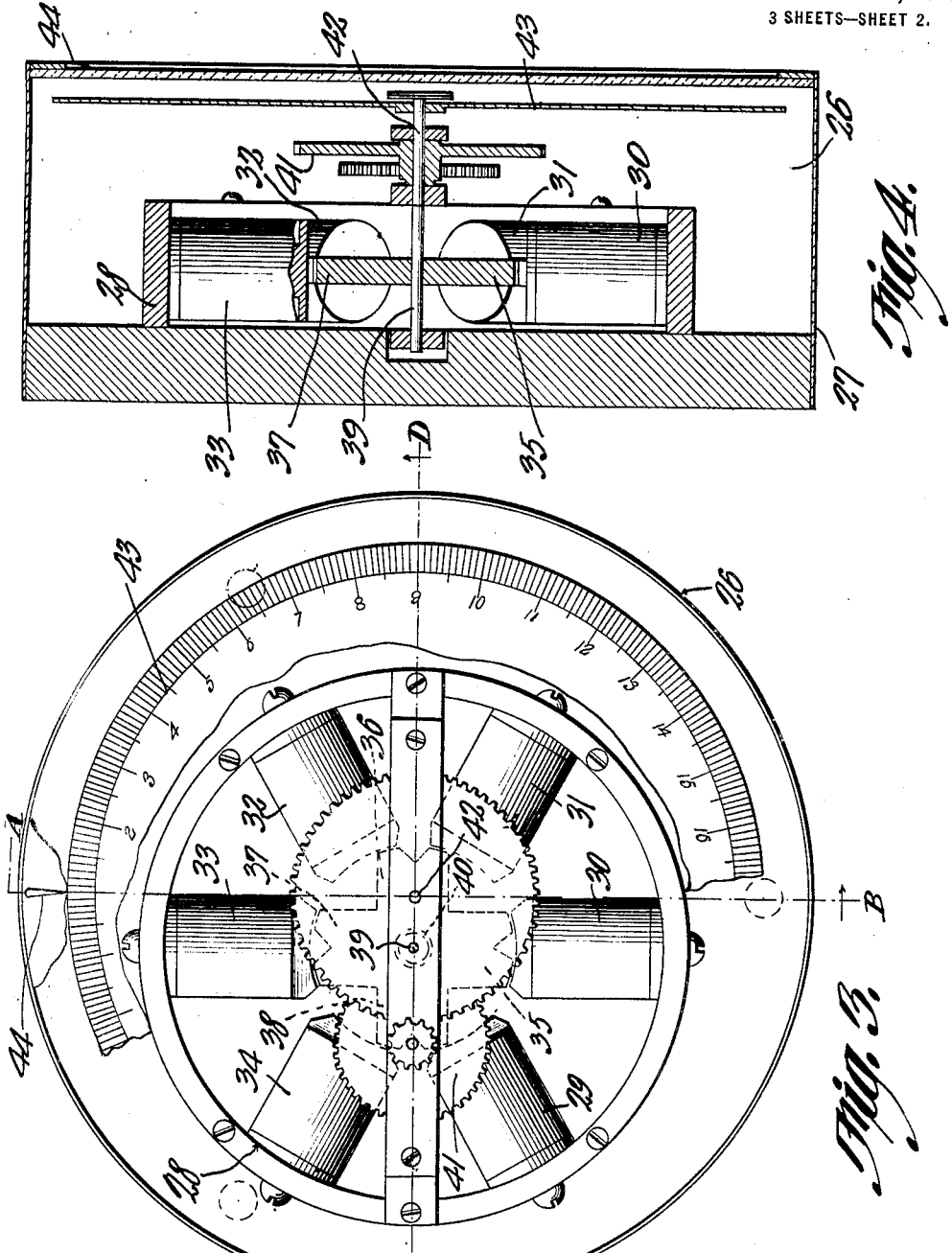
Witnesses
Delbert W. Proebstel
Inventor
by C. A. Snow & Co.
Attorneys

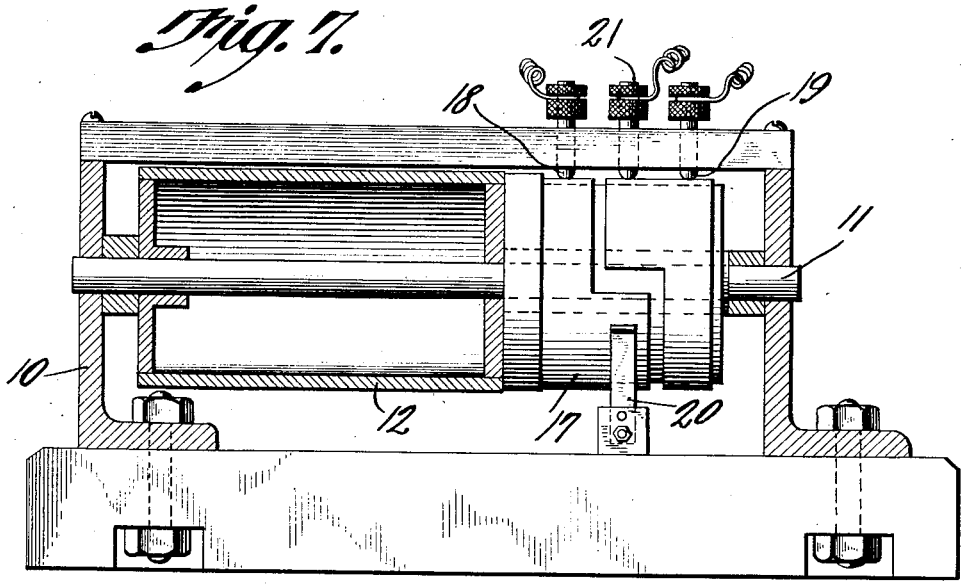
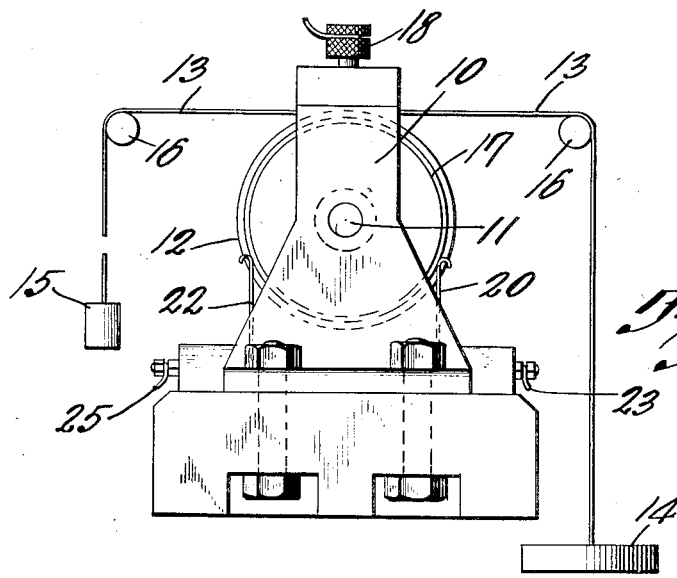

UNITED STATES PATENT OFFICE.

DELBERT W. PROEBSTEL, OF TREADWELL, TERRITORY OF ALASKA.

WATER-STAGE INDICATOR.

1,229,785.  Specification of Letters Patent.  Patented June 12, 1917.

Application filed March 31, 1914. Serial No. 828,558.

*To all whom it may concern:*

Be it known that I, DELBERT W. PROEBSTEL, a citizen of the United States, residing at Treadwell, S. E., Territory of Alaska, have invented a new and useful Water-Stage Indicator, of which the following is a specification.

This invention relates to apparatus for indicating water stages, one of its objects being to transmit the readings of water levels in dams, rivers, tide waters, etc., to remote places for the convenience of persons desiring such information.

Another object is to provide a novel form of controller whereby the actuation of the indicator will be effected accurately.

A further object is to provide a novel form of indicator connected electrically to the controller for accurately disclosing the water level at the controller.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings one of the preferred forms of the invention has been shown.

In said drawings:—

Figure 1 is a view showing in diagram the back of the indicator, the controller and connections.

Fig. 2 is a view showing, diagrammatically, the indicator and its connections with the controller and showing the successive changes in the polarity of the magnets of the indicator whereby intermittent rotation of the armatures of the indicator in either direction is produced by either intermittent or continuous rotation of the controller in either direction.

Fig. 3 is a front elevation of the indicator, parts being broken away.

Fig. 4 is a section on line A—B Fig. 3.

Fig. 5 is a section on line C—D Fig. 3.

Fig. 6 is an end view of the controller.

Fig. 7 is a vertical longitudinal section through the controller, the top bar of the frame and the commutator being shown in elevation.

Referring to the figures by characters of reference 10 designates a suitable holding frame in which is journaled a shaft 11. Mounted for rotation on this shaft is a drum 12 on which oppositely extending wires, cords, or the like 13 are adapted to be wound, one of these wires being connected to a float 14 while the other wire is connected to a weight 15 constituting a counterbalance. The wires or other flexible connections indicated at 13 may be mounted on suitable guide sheaves, such as shown at 16 and it is to be understood that float 14 is to rest upon the surface of the body of water, the stages of which are to be indicated. The two connections 13 are wound in opposite directions so that while one of them is being wound on the drum 12, the other is being unwound.

A commutator 17 rotates with the drum 12 and has combined therewith contacts 18 and 19 electrically connected, as shown in Fig. 2, to the source of the direct current utilized. Additional contacts 20 21 and 22 are combined with the commutator and are connected by the respective conductors 23, 24 and 25 to the indicator 26 which may be located at any desired distance from the controller. The contacts or brushes 20 and 22 are in the form of upstanding leaf springs carried by the base of the frame 10, while the contacts or brushes 18, 19 and 21 are carried by the arch of the frame 10 and are disposed in a longitudinal line of the frame. The indicator includes a casing 27 having eccentrically mounted therein a motor which might be termed a D. C.—synchronous motor. This motor, which has been indicated generally at 28, is eccentrically mounted in the casing and includes fixed stationary poles or magnets designated generally at 29, 30, 31, 32, 33, and 34 respectively. Four movable poles or armatures 35, 36, 37 and 38 are also utilized. These armatures are secured to a shaft 39 to which a small gear 40 is secured and said small gear transmits motion through a train of gears 41 to an arbor 42. A dial plate 43 rotates with the arbor 42 relative to a fixed hand or pointer 44. A series of graduations are arranged on said dial plate, indicating feet and fractions thereof or any other units of measure desired.

The wiring of the fixed poles or magnets has been indicated clearly in diagram in Fig. 2 and the direction of the circuit through the commutator and the magnets during the successive movements of the commutator can be determined readily from said figure.

With the parts positioned as indicated in Fig. 2, the contact 18, which is the positive contact, is electrically connected through one of the segments of the commutator, with the contact 20 while the contact 19 which is the negative contact, is electrically connected, through another segment of the commutator, with the contacts 22 and 21. These positions of the contacts relative to each other only occur when the commutator is brought to one of six positions which the commutator assumes during its rotation. When the commutator is moved to its next position, the contact 21 is brought into electrical communication with the contacts 18 and 20 while when the commutator is brought to its third position, the contacts 18 and 21 are in direct communication while the contacts 19, 22 and 20 are electrically connected. These and the remaining relations of the contacts have been indicated by the positive and negative symbols in Fig. 2.

By referring to the diagrammatic showing of the motor in Fig. 2 it will be seen that the magnets or poles are arranged in pairs, the poles of each pair being diametrically opposite each other, and in any position of the controller 17, two pairs of these poles or magnets are of like polarity while the third pair is of the opposite polarity. Consequently one change of the controller in either direction will cause the polarity of one of the pairs of magnets to change and this will result in the rotation of the movable poles or armatures and their shaft 39 in one direction or the other, depending upon the direction in which the controller is moved. This movement is always through a fixed angle, in the present instance, one-twelfth of a complete revolution. The parts are so proportioned that this one-twelfth rotation will result in the movement of the dial 43 one graduation relative to the fixed indicator 44.

In the form illustrated, a one-tenth foot variation in the water level will result in revolving the controller drum one-sixth of a revolution thus effecting one change of connections between the contacts 18, 19, 20, 21 and 22 and causing dial 43 to move one point or graduation.

As shown particularly in Fig. 1, a lamp 45 in the controller circuit. and a lamp 46 in the circuit of the movable magnets 35, 36, 37, and 38 which are separately excited, is used for external resistance.

It is to be understood that any suitable recorder may be combined with the indicator so as to provide a permanent record of the readings of the water stages, but as the recorder constitutes no part of the present invention, it is not deemed necessary to enter into a description or illustration thereof.

Importance is attached to the fact that by providing the peculiar means disclosed for rotating the armatures of the indicator said armatures will always rotate in the direction in which the commutator of the controller is rotating.

What is claimed is:—

1. A commutator for an indicator device, having a pair of rings provided with a pair of opposite segments projecting toward the opposite rings, each segment extending through almost one-half of a circle, a pair of brushes contacting continuously with said rings and connected to positive and negative poles of a source of electrical energy, and three equally spaced brushes coöperating with and contacting the segments between said rings, whereby one segment is engaged by one of the last mentioned brushes while the other is engaged by the other two of the last mentioned brushes.

2. In a device of the character described, a frame having a base and an arch, a shaft mounted for rotation within the arch, a commutator carried by the shaft and having a pair of rings provided with a pair of opposite segments projecting toward the opposite rings, each segment extending through almost one-half of a circle, three brushes carried by the arch, two of them contacting continuously with the two rings and the third being engageable with the segments between the rings, and a pair of leaf spring brushes carried by the base and contacting with said segments between the rings, the third brush and last mentioned brushes being spaced equally apart so that one of them always engages one segment while the other two engage the other segments.

In testimony that I claim the foregoing as my own, I have hereto affixed my signature in the presence of two witnesses.

DELBERT W. PROEBSTEL.

Witnesses:
C. M. FRAINEY,
G. EVERT BAKER.